United States Patent [19]

Crus et al.

[11] Patent Number: 5,133,068
[45] Date of Patent: Jul. 21, 1992

[54] COMPLIED OBJECTIVE REFERENTIAL CONSTRAINTS IN A RELATIONAL DATABASE HAVING DUAL CHAIN RELATIONSHIP DESCRIPTORS LINKED IN DATA RECORD TABLES

[75] Inventors: Richard A. Crus, San Jose; Michael J. Dockter, Hollister; Robert W. Engles, San Jose; Donald J. Haderle, Los Gatos, all of Calif.

[73] Assignee: International Business Machines Corporation, Armonk, N.Y.

[21] Appl. No.: 754,227

[22] Filed: Aug. 28, 1991

Related U.S. Application Data

[63] Continuation of Ser. No. 249,049, Sep. 23, 1988, abandoned.

[51] Int. Cl.$^5$ .................. G06F 7/00; G06F 15/40
[52] U.S. Cl. ...................... 395/600; 364/DIG. 1; 364/282.1; 364/283.4; 364/974; 364/974.4; 364/974.5
[58] Field of Search ... 364/200 MS File, 900 MS File

[56] References Cited

U.S. PATENT DOCUMENTS

| | | | |
|---|---|---|---|
| 4,498,145 | 2/1985 | Baker et al. | 364/900 |
| 4,631,673 | 12/1986 | Haas et al. | 364/200 |
| 4,870,397 | 9/1989 | Soto et al. | 340/747 |
| 4,918,593 | 4/1990 | Haber | 364/200 |
| 4,933,848 | 6/1990 | Haderle et al. | 364/300 |
| 4,947,320 | 8/1990 | Crus et al. | 364/200 |
| 5,043,872 | 8/1991 | Cheng et al. | 364/200 |

OTHER PUBLICATIONS

Stonebraker, et al., "Object Management in POSTGRES Using Procedures", University of California, Berkeley, Jun., 1986.
Lindsay, et al., "A Data Management Extension Architecture", Proceedings of ACM-SIGMOD Conference on Management of Data, May, 1987, pp. 220-226.
Simon, et al., "Efficient Algorithms for Integrity Control in a Database Machine", Proceedings IEEE Trends and Applications, 1984, pp. 53-59.
Simon, et al., "Design and Implementation of an Extendible Integrity Subsystem", Proceedings ACM-SIGMOD 1984, pp. 9-17.
Dogac, et al., "The Design and Implementation of an Integrity Subsystem for the Relational DBMS RAP", IEEE Fourth International Conference on Entity-Relationship Approach 1985, pp. 295-302.

*Primary Examiner*—Thomas C. Lee
*Assistant Examiner*—Krisna Lim
*Attorney, Agent, or Firm*—Pryor A. Garnett

[57] ABSTRACT

An implementation of referential integrity in which descriptions of referential constraints are compiled into meta-data descriptions of the constraint rules and specifications. The meta-data descriptions of the constraints are stored in the form of objects called relationship descriptors. Each relationship descriptor contains a complete description of a referential constraint, either directly or by means of pointers to other objects such as record and index descriptors which contain information comprised in the constraint's specification. The relationship descriptors are linked into two types of chains by symbolic pointers. One type of relationship descriptor chain connects all relationship descriptors which have a common parent table. The other type of relationship descriptor chain connects relationship descriptors with common dependent tables. Both types of chains are anchored in respective fields in the tables' record descriptors. The use of meta-data descriptors facilitates both ready modification of the constraints, and speedy enforcement of the constraints by a single, shared procedure which may be embedded in the data base manager.

12 Claims, 5 Drawing Sheets

RELATIONAL DATA BASE MANAGEMENT SYSTEM

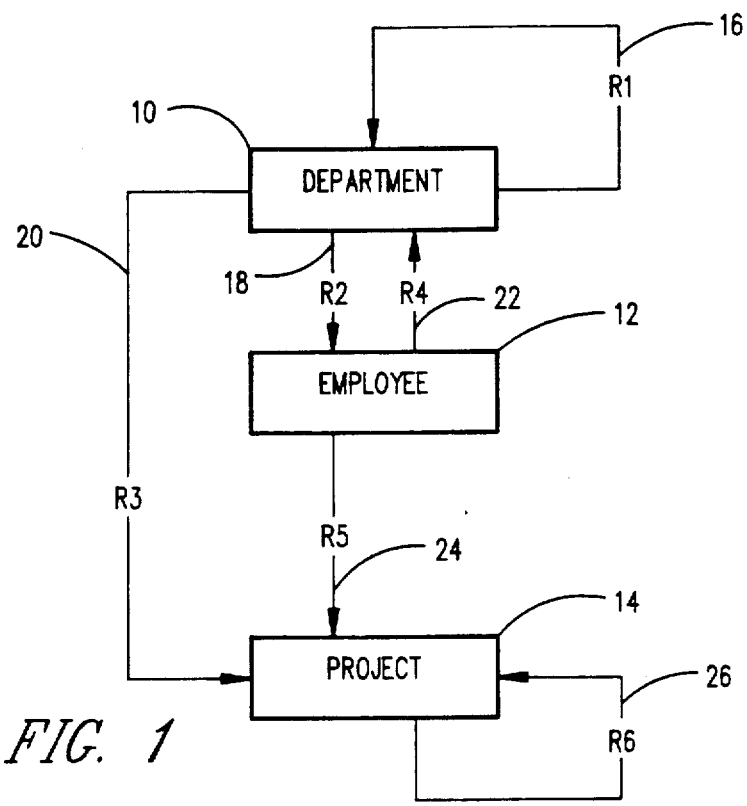

FIG. 1

| Ref'l Constraint ID | Parent Table | Primary Key Column | Dependent Table | Foreign Key Column | Delete Rule | Update Rule |
|---|---|---|---|---|---|---|
| R1 | DEPARTMENT | DEPTNO | DEPARTMENT | ADMRDEPT | CASCADE | RESTRICT |
| R2 | DEPARTMENT | DEPTNO | EMPLOYEE | WORKDEPT | SET NULL | CASCADE |
| R3 | DEPARTMENT | DEPTNO | PROJECT | RESPDEPT | RESTRICT | CASCADE |
| R4 | EMPLOYEE | EMPNO | DEPARTMENT | MGRNO | SET NULL | SET NULL |
| R5 | EMPLOYEE | EMPNO | PROJECT | RESPEMP | RESTRICT | RESTRICT |
| R6 | PROJECT | PROJNO | PROJECT | MAJPROG | CASCADE | RESTRICT |

FIG. 2

Table: DEPARTMENT
- Primary Key
- Foreign Key (Employee)
- Foreign Key (Department)

10 →

| DEPTNO | DEPTNAME | MGRNO | ADMRDEPT |
|---|---|---|---|
| A00 | SPIFFY CO | 000010 | A00 |
| D01 | DEVEL CTR | (null) | A00 |
| D21 | ADMIN SYS | 000070 | D01 |
| E01 | SUPPORT SER | 000050 | A00 |
| E11 | OPERATIONS | 000090 | E01 |
| E21 | SOFTWARE SU | 000100 | E01 |

*FIG. 3*

Table: EMPLOYEE
- Primary Key
- Foreign Key (Department)

12 →

| EMPNO | FIRSTNAME | WORKDEPT |
|---|---|---|
| 000010 | CHRISTINE | A00 |
| 000050 | JOHN | E01 |
| 000070 | EVA | D21 |
| 000090 | EILEEN | E11 |
| 000100 | THEODORE | E21 |
| 000280 | ETHEL | E11 |
| 000320 | RAMLAL | E21 |

*FIG. 4*

Table: PROJECT

Primary Key — PROJNO
Foreign Key (Department) — RESPDEPT
Foreign Key (Employee) — RESPEMP
Foreign Key (Project) — MAJPROJ

| PROJNO | PROJNAME | RESPDEPT | RESPEMP | MAJPROJ |
|--------|----------|----------|---------|---------|
| AD3100 | ADMIN SERV | D01 | 000010 | (null) |
| MA2100 | WELD LINE A | D01 | 000010 | (null) |
| OP1000 | OPER SPT | E01 | 000050 | (null) |
| OP1010 | OPERATION | E11 | 000090 | OP1000 |
| OP2000 | GEN SYS SER | E01 | 000050 | (null) |
| OP2010 | SYS SUPPORT | E21 | 000100 | OP2000 |
| OP2012 | SCP SYS SPT | E21 | 000320 | OP2010 |

RELATIONAL DATA BASE MANAGEMENT SYSTEM

COMPLIED OBJECTIVE REFERENTIAL CONSTRAINTS IN A RELATIONAL DATABASE HAVING DUAL CHAIN RELATIONSHIP DESCRIPTORS LINKED IN DATA RECORD TABLES

This application is a continuation of application Ser. No. 249,049, filed on Sep. 23, 1988, now abandoned.

BACKGROUND OF THE INVENTION

1. Technical Field

This invention relates to relational data base management systems, and more particularly to the structural representation of referential constraints within the data base manager.

2. Description of the Prior Art

A data base management system is a computer system for recording and maintaining data. In a relational data base management system, data is stored in "tables" which can be viewed as having horizontal rows and vertical columns. The Database 2 product of the International Business Machines Corporation (IBM) is an example of a typical relational data base management system.

Within relational data bases, an important function is that of "referential integrity". Referential integrity ensures the consistency of data values between related columns of two different tables (or of the same table) by enforcing required relationships between tables' columns. These required relationships are known as "referential constraints". A row in a "dependent table" possesses referential integrity with respect to a constraint if the value of its "foreign key" matches the value of a "primary key" in some row of a "parent table", or if the value of its foreign key is null, i.e. which contains no value. In other words, every row in the dependent table which has a non-null value must have a corresponding parent row in the parent table. If a dependent row's foreign key has no matching primary key value in the parent table, then that referential constraint is violated and there is a loss of referential integrity in the data base comprising those tables. To enforce referential constraints and thereby maintain the data base's referential integrity, the system must ensure that non-null foreign key values always have corresponding primary key values. In implementations of referential integrity the system also ensures that primary key values are unique, a property known as "entity integrity".

By way of example, consider an EMPLOYEE table that contains employee and department numbers, and a DEPARTMENT table that contains department numbers. Referential integrity might require that for every department number in the EMPLOYEE table there must be an equal and unique department number in the DEPARTMENT table. This would require a referential constraint defined on the EMPLOYEE table. The department number in the DEPARTMENT table would be the primary key, and the department number of the EMPLOYEE table would be the foreign key, in this constraint.

Referential constraints must be enforced whenever the data of a data base is manipulated so as to affect primary or foreign keys. In relational data base management systems which use the Structured Query Language (SQL), data is primarily modified by the LOAD, INSERT, DELETE, and UPDATE commands and their resulting operations. The LOAD and INSERT commands both add (insert) data to the data base, with LOAD typically adding many rows and INSERT adding only a few. DELETE deletes one or more rows, and UPDATE changes the contents of one or more rows. Whenever one of these operations occurs, the referential constraints involving the modified rows must be enforced to ensure the data base's referential integrity.

One method of maintaining referential integrity in a relational data base management system provides the system with means for supporting procedures (programs or routines) residing outside the system which are executed when certain predefined events occur. An example of such a procedure would be to execute a particular program whenever data is inserted into a particular table. The procedure might update an index on the table, or enforce a referential constraint on the newly inserted data. This latter would be an example of a "procedural" implementation of referential integrity. Several relational data base management products have added procedural implementations of referential integrity.

Procedural implementations of referential integrity suffer from several drawbacks which make them slow and inefficient. Because the procedures are external (outside the system), they require extra processing at the interface between the system and the procedure. This processing overhead is not incurred by internal subsystems within the overall system. There is thus a need for an implementation of referential integrity which does not incur the processing overhead associated with external procedures.

More importantly, because external procedures are invoked before or after (but not while) the system modifies the data, the data must be accessed twice—once by the system and again by the procedure. This doubling of the number of data accesses can greatly reduce the system's overall speed. There is thus a need also for an implementation of referential integrity which accesses newly modified data only once, eliminating the redundant double access associated with procedural implementations.

Procedural implementations of referential integrity have yet another disadvantage—the constraints they implement are comprehensible only to computer programmers. The programming languages used to write the procedures are seldom understandable to the data base user, and the process of changing the constraint is impossible for the ordinary user of the data base. There is a need for an implementation of referential integrity which allows non-programmers to readily understand and modify the referential constraints.

The needs identified above, and others in which may be set forth below, are satisfied by the invention of this application, which is summarized as follows.

SUMMARY OF THE INVENTION

This invention comprises a computer-implemented, relational data base management system which includes an objective implementation of referential integrity. The system includes at least two relational tables containing records of data, and at least one relationship descriptor. The relationship descriptor describes a referential constraint between the tables, identifying the constraint's parent and dependent tables and primary and foreign keys. The relationship descriptor is a separate object within the data base system and provides the implementation with its objective character. The system also includes means for accessing the relationship descriptor when the table is to be modified, and means for enforcing the referential constraint described by the relationship descriptor upon such modification of the table.

The relationship descriptors are preferably compiled and stored in the data base manager for faster execution during operation of the system. The means for accessing the relationship descriptors preferably comprises two chains of symbolic pointers between the relationship descriptors and record descriptors describing the data base's tables.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 shows three tables related by six referential constraints.

FIG. 2 lists the specifications of the referential constraints of FIG. 1.

FIG. 3 shows the DEPARTMENT table of FIG. 1, including its primary and foreign keys and sample data.

FIG. 4 shows the EMPLOYEE table of FIG. 1, including its primary and foreign keys and sample data.

FIG. 5 shows the PROJECT table of FIG. 1, including its primary and foreign keys and sample data.

FIG. 6 is a schematic representation of the objective record, index and relationship descriptors according to this invention for the tables of FIGS. 1-5.

DESCRIPTION OF THE PREFERRED EMBODIMENT

Referential Integrity

Figure 7:
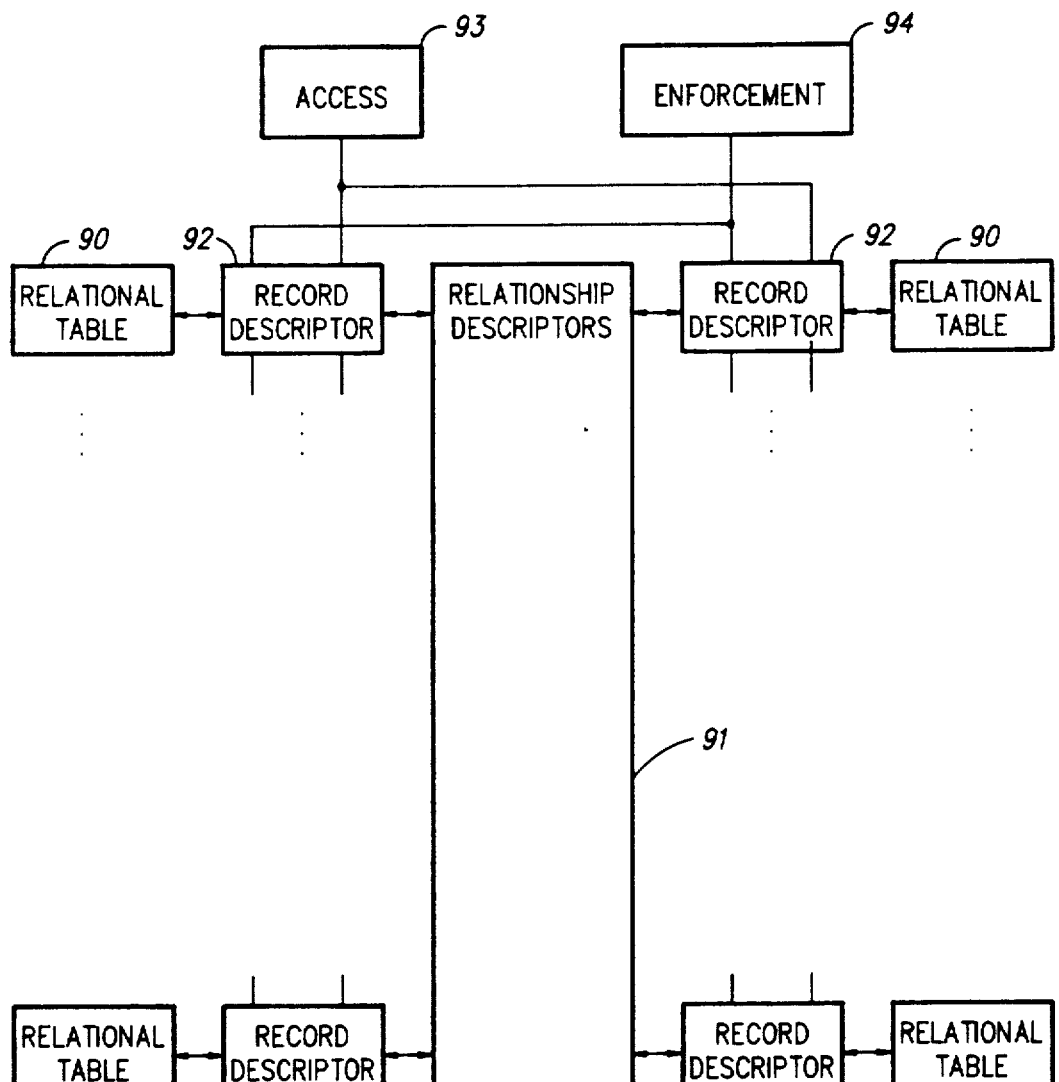
FIG. 7 is a block diagram representation of the relational database management system according to this invention.

FIG. 1 shows three tables related by six referential constraints. The DEPARTMENT table 10 describes each department in an enterprise by number DEPTNO and name DEPTNAME, and identifies its manager MGRNO and the number ADMRDEPT of the department to which it reports. The EMPLOYEE table 12 identifies all employees by an employee number EMPNO, lists basic personnel information, and identifies the department WORKDEPT in which the employee works. The PROJECT table 14 describes each project in which the business is currently engaged, listing the project number PROJNO, project name PROJNAME, employee responsible and department responsible, and identifying the major project MAJPROJ of which the individual project is a part. FIGS. 3-5 show sample data for these tables.

The tables of FIG. 1 are related to each other and to themselves by six referential constraints, as listed in FIG. 2. Constraint R1 16 requires the reporting department ADMRDEPT in the DEPARTMENT table 10 to be a valid department number DEPTNO in the DEPARTMENT table. Thus, the parent table of constraint R1 16 is DEPARTMENT, the primary key is the DEPTNO column in the DEPARTMENT table, and the primary index is the DEPTNO index. The foreign key of constraint R1 16 is the ADMRDEPT column of the DEPARTMENT table 10, making DEPARTMENT the dependent table as well as the parent. Because its parent and dependent tables are the same, constraint R1 16 is a self-referencing constraint.

Constraint R2 18 requires each employee's work department WORKDEPT (foreign key) in the EMPLOYEE (dependent) table 12 to be a valid department DEPTNO (primary key) in the DEPARTMENT (parent) table 10. Constraint R3 20 states that the responsible department RESPDEPT in the PROJECT table 14 must be a valid department DEPTNO in the DEPARTMENT table 10. Constraint R4 22 requires the manager MGRNO of a department in the DEPARTMENT table 10 to be a valid employee EMPNO in the EMPLOYEE table 12. Constraint R5 24 requires the responsible employee RESPEMP for a project in the PROJECT table 14 to be a valid employee EMPNO in the EMPLOYEE table 12. Finally, constraint R6 26 states that the major project MAJPROJ of a project in the PROJECT table 14 must itself be a valid project number PROJNO in the PROJECT table 16. R6 is also a self-referencing constraint.

To summarize the terminology used in this description, the term "row" refers to the external view of a record as it exists within a table, while "record" refers to the internal representation of data in the row as it is stored within a data base. A "parent row" is a row of a "parent table", and has a "primary key value" matching foreign key values in one or more dependent rows. A "dependent row" is a row of a "dependent table", and has a "foreign key value" that matches the primary key value of some parent row. A "self-referencing constraint" is a constraint defined within the same table— that is, the foreign key and primary key are in the same table. Within a self-referencing table there may exist "self-referencing rows" where the foreign key matches the primary key in the same row. Constraints R1 16 and R6 26 are self-referencing. A "cycle" is a set of constraints such that a table within a cycle is a dependent of itself. Constraints R2 18 and R4 22 form a cycle. Within cycles, a cycle of rows may exist where a given row is a dependent of itself.

Each constraint shown in FIG. 2 includes an "insert rule", a "delete rule", and an "update rule". These rules specify what action is to occur with respect to referential constraints when data base modifications are made.

There is only one type of insert rule, INSERT, and it requires that any row inserted into a dependent table must have a foreign key value which is equal to the value of a primary key in the parent table that it references, or which is null. In other words, every row in every dependent table which has a non-null foreign key value must have a matching row in its respective parent table.

The delete rule specifies what happens when a row in a parent table is deleted. The delete rule has three options. With DELETE RESTRICT, a row of a parent table cannot be deleted if there are rows in dependent table(s) with foreign key values equal to the primary key value of the record. Thus, no parent row can be deleted while it has any dependent rows. With DELETE CASCADE, if a row in a parent table is deleted, then all rows in the dependent table(s) with a foreign key value equal to the primary key value of this row will also be deleted. In other words, deletion of a parent row automatically deletes all of its dependent rows (and their dependents, and so on). Finally, with DELETE SET NULL, if a row of a parent table is deleted, then the foreign key in all records in the dependent tables which are equal to the primary key value of the parent row being deleted will be set to a null value (i.e., a state which indicates that the foreign key contains no value). The SET NULL option ensures that the dependent rows will not refer to a nonexistent parent row while avoiding wholesale deletion of the dependents.

The update rule specifies what happens when a primary key or foreign key is updated. The update rule for foreign keys ensures that if a foreign key is updated to a non-null value, then that value must match the primary key of a row of the parent table. The update rule for primary keys has the same three options as the delete rule, although they operate somewhat differently. UPDATE RESTRICT prevents the primary key of a parent table from being updated if there are rows in dependent table(s) with foreign key values equal to the primary key value of the parent row. Thus, no parent row's primary key can be updated until its dependent rows' foreign keys have been updated. UPDATE CASCADE propagates an update of a parent row's primary key to that row's dependent rows' foreign keys. If a primary key in a parent table is updated to a certain value, then all the foreign keys in all rows in the dependent table whose original foreign key value was equal to the original primary key value of the parent will be updated to match the new value of the primary key, and any rows which depend on those dependent rows will be updated as well. With UPDATE SET NULL, if a primary key of a parent table is updated, then the foreign key in all rows in the dependent table which are equal to the primary key value of the parent row whose primary key is being updated will be set to a null value (i.e., a state which indicates that the foreign key contains no value).

Objective Descriptors

In the preferred embodiment of this invention, each table is described by a "record descriptor", which contains the name of the table and a description of the fields which comprise each record in the table. Each record descriptor exists as a separate and independent object in the data base system, and can be modified (to modify the definition of a table) without affecting other table descriptors in the system. For this reason, such descriptors are termed "objective".

In addition to the record descriptors, each index on each table is described by an "index descriptor". An index descriptor includes the description of the key for which the index is defined. Thus, the index descriptor for the primary key of a parent table (the "primary key index descriptor") contains a description of the primary key, including the number of fields and a list of relative field numbers in the parent table in primary key sequence. The index descriptors, too, are objective, because they exist as separate and independent objects in the data base system and can be modified individually.

This invention compiles referential constraint descriptions into objects called "relationship descriptors", each of which contains the meta-data description of a single constraint. The characteristic of compilation is a principal distinction between this invention's referential integrity implementation and the implementations of the prior art, in that is allows the construction of a single shared procedure, embedded in the data base manager, for enforcing referential constraints according to the rules expressed in the meta-data descriptor. The characteristic of objectiveness distinguishes this invention's implementation from the procedural prior art implementations of referential integrity.

Each relationship descriptor completely describes a single referential constraint, identifying the parent and dependent tables, the primary index on the parent table, and the columns making up the foreign key. The primary index's descriptor in turn identifies the columns of the primary key. If an (optional) index is either defined on the columns of the foreign key or defined on columns such that the left-most columns of the index key contain the foreign key, then the relationship descriptor also identifies this foreign key index. The relationship descriptor also specifies the constraint's delete and update rules. The objective relationship descriptors of this invention greatly simplify the process of enforcing referential constraints, because a single enforcement procedure can be used in place of the various procedures found in other implementations of referential integrity. Furthermore, the objective relationship descriptors are located and accessed as part of the data base system's specification in the computer's high-speed volatile memory during system operation. This provides the system with very fast access to descriptions of referential constraints compared to prior art implementations of referential integrity which store constraint descriptions outside their data base management systems' memory-resident specification.

The index descriptors are chained off the record descriptors by pointers. The relationship descriptors are doubly chained off the record descriptors by two sets of pointers. One set of relationship descriptor pointers forms "parent table chains" which identify relationships in which a given table is the parent. The other set of relationship descriptor pointers forms "dependent table chains" which identify relationships in which a given table is the dependent. These chains allow rapid identification and enforcement of referential constraints affecting a modification to a table.

Because the meta-data description of constraint rules has been compiled into a single object which participates in parent and dependent chains, the management of removing constraints is greatly simplified. There are two ways in which a constraint may be removed. First, the constraint may be explicitly removed when referential integrity between two tables is no longer desired. Second, the constraint may be implicitly removed when one of the tables in the relationship ceases to exist.

In the simple case, when a constraint is explicitly removed, the relationship descriptor is taken off all chains and purged; ending the relationship between two tables.

In the more complex case, when one of the tables in the relationship is dropped, all relationships which involve the dropped table must be removed. Because the record descriptor of the dropped table contains the anchors to both the chain of relationship descriptors in which it is a parent and the chain of relationship descriptors in which it is a dependent, the removal of all of the constraints involving the dropped table involves starting at each anchor and purging each relationship descriptor in the chain. This is an efficient way of removing all relationships between the dropped table and other tables.

Organization of Descriptors Within Data Bases

Figure 6:
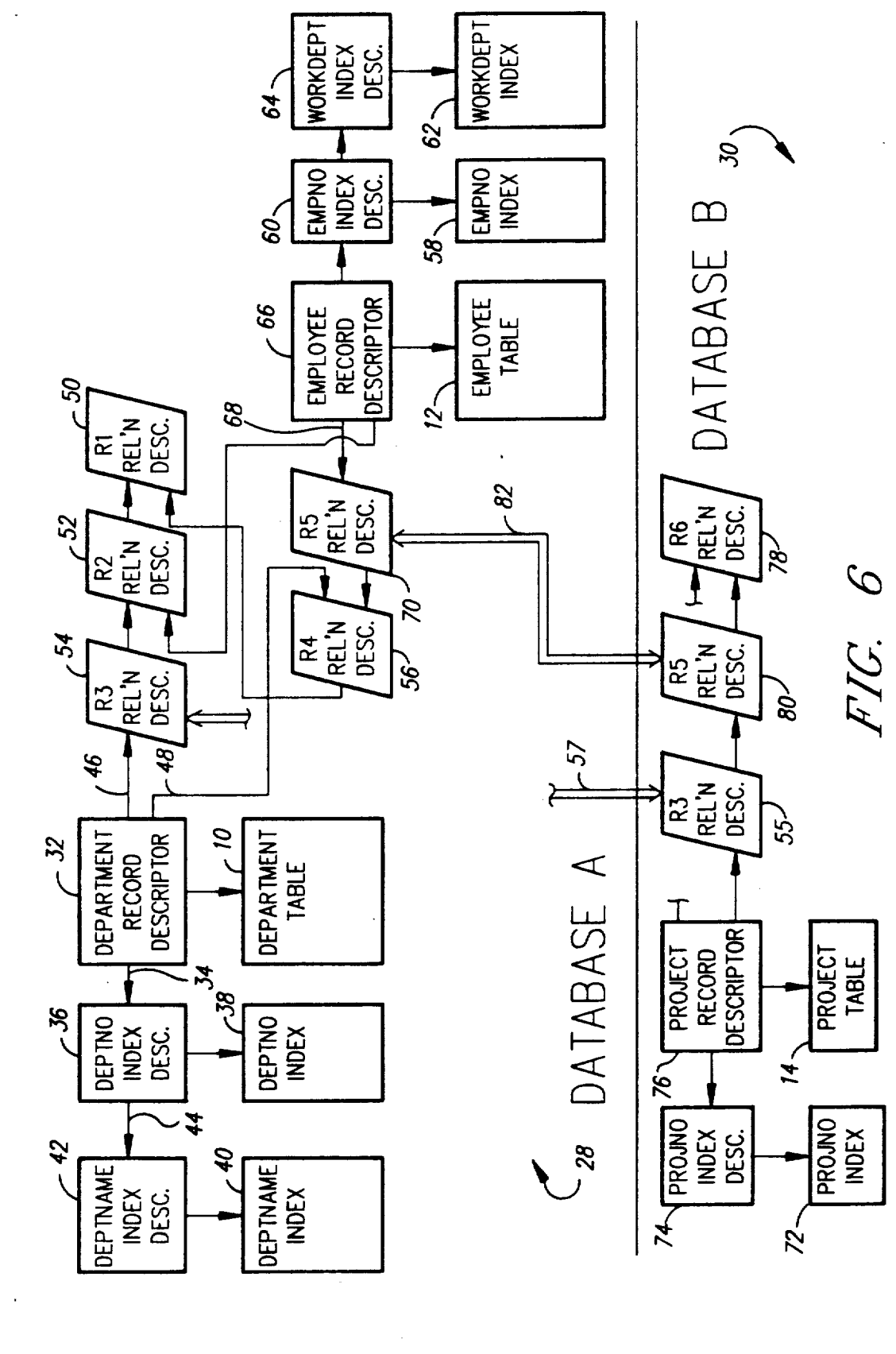

The organization of the record, index, and relationship descriptors is best seen with reference to FIG. 6, which schematically shows record, index, and relationship descriptors for the three tables shown in FIGS. 1-5.

FIG. 6 shows two data bases, data base A 28 and data base B 30. Data base A 20 contains the DEPARTMENT table 10 and the EMPLOYEE table 12 described above and shown in both FIGS. 3 and 4, respectively. Data base A 28 further includes the indexes and record, index, and relationship descriptors for these tables. Data base B 30 contains the PROJECT table 14 of FIG. 5, together with the index and descriptors associated with that table.

The DEPARTMENT record descriptor 32 contains information describing the records of the DEPARTMENT table 10. Such information would include the types and lengths of the columns comprising the table 10. Such information is not necessary to an understanding or description of this invention, and is not discussed further. The DEPARTMENT record descriptor 32 further contains a pointer 34 to the index descriptor 36 for the DEPTNO index 38. The DEPTNO index 38 is defined on the DEPTNO column, which is the primary key of the DEPARTMENT table 10. Thus, the DEPTNO index 38 is the primary key index for the DEPARTMENT table 10.

A second index, DEPTNAME 40, is defined on the DEPTNAME column of the DEPARTMENT table 10, thereby providing means for placing the rows of the DEPARTMENT table in alphabetical order by department name. The DEPTNAME index 40 is described by its associated index descriptor 42. A pointer 44 from the DEPTNO index descriptor 36 identifies the DEPTNAME index descriptor 42. Thus, the pointers 34, 44 place the DEPTNO and DEPTNAME index descriptors 36, 42 in a chain originating from the DEPARTMENT record descriptor 32.

In the preferred embodiment of this invention, a data base's relationship descriptors are doubly chained off that data base's record descriptors. One set of chains connects the various relationship descriptors to their respective parent table, and the second set connects the relationship descriptors to their dependent tables.

As seen in FIG. 6, the DEPARTMENT record descriptor 32 contains two pointers 46, 48. The first pointer 46 points to the first relationship descriptor in which the DEPARTMENT table 10 is the parent table. The second pointer 48 points to the first relationship descriptor in which DEPARTMENT table is the dependent table. For easier reference, pointers to and from relationship descriptors in FIG. 6 are drawn so that pointers in the "parent chain" of relationship descriptors are above pointers in the "dependent chains".

The first relationship descriptor in which the DEPARTMENT table 10 is the parent table is the descriptor 54 for referential constraint R3 20. The R3 relationship descriptor 54 is the first descriptor in the DEPARTMENT parent chain. Thus, pointer 46 points from the DEPARTMENT record descriptor 32 to the R3 relationship descriptor 54. Constraint R3's parent and dependent tables are in different data bases. Its parent table DEPARTMENT 10 is located in data base A 28, while its dependent table PROJECT 76 is located in data base B 30. One R3 relationship descriptor 55 is located in data base B 30, and is connected to the first R3 relationship descriptor by two opposing pointers 57. The second R3 descriptor 55 is at the head of the dependent chain originating from the PROJECT record descriptor 76.

The parent chain from the DEPARTMENT in record descriptor 32 continues from the R3 relationship descriptor 54 to the R2 relationship descriptor 52, and from there to the R1 relationship descriptor 50. Constraint R1 16 is self-referencing, having the same table DEPARTMENT 10 as both its parent and dependent table. It is the last descriptor in the Department parent chain, preceded by R3 relationship descriptor 54 and R2 relationship descriptor 52. It is also the last descriptor in the DEPARTMENT dependent chain. Pointer 48 points from the DEPARTMENT record descriptor 48 to the first member of the DEPARTMENT dependent chain—the R4 relationship descriptor 56. The dependent chain from the DEPARTMENT record descriptor 32 continues from the R4 descriptor 56 to the R1 relationship descriptor 50.

The EMPLOYEE table 12 of data base A 28 has two indexes, much like the DEPARTMENT table 10. The EMPNO index 58 on the EMPNO column of the EMPLOYEE table 12 is the primary key index for that table, and is described by the EMPNO index descriptor 60. The WORKDEPT index 62 indexes the EMPLOYEE table 12 on the WORKDEPT column, maintaining an ordering of the rows of employees according to the department in which they work. The WORKDEPT index 62 is described by the WORKDEPT index descriptor 64. Both the EMPNO and WORKDEPT index descriptors 60, 64 are chained off of the EMPLOYEE record descriptor 66.

The parent chain of relationship descriptors for the EMPLOYEE table 12 originates from the EMPLOYEE record descriptor 66. The first referential constraint having the EMPLOYEE table 12 as its parent table is constraint R5 24, which is described by the R5 relationship descriptor 70. Thus, the EMPLOYEE record descriptor 66 contains a pointer 68 to the R5 relationship descriptor 70. The parent chain for the EMPLOYEE table 12 continues from the R5 relationship descriptor 70 to the R4 relationship descriptor 56. The EMPLOYEE table 12 is the dependent table of only one referential constraint, R2 18. Thus, the dependent chain from the EMPLOYEE record descriptor 66 extends only to the R2 relationship descriptor 52.

The PROJECT table 14 in data base B 30 has only one index, its primary key index PROJNO 72, which is described by its associated index descriptor 74. The PROJNO index descriptor 74 is chained off the PROJECT record descriptor 76. The PROJECT table 14 is the parent table of only one referential constraint, self-referencing constraint R6 26. Accordingly, the PROJECT parent chain (originating from the PROJECT record descriptor 76) has only one member, the R6 relationship descriptor 78.

The PROJECT table 14 is the dependent table in three referential constraints, R3 20, R5 24, and R6 26. Constraint R6 26 is self-referencing, and its relationship descriptor 78 is the first and only descriptor in the PROJECT parent chain. The R6 descriptor 78 is the last member of the PROJECT dependent chain.

The parent and dependent tables for referential constraint R5 24 are located in different data bases. Its parent table EMPLOYEE 12 is located in data base A 28, while its dependent table PROJECT 76 is located in data base B 30. Similar to constraint R3, a first R5 relationship descriptor 70 is located in data base A 28, and a second R5 descriptor 80 is located in data base B 30. The dependent chain from the PROJECT record descriptor 76 thus extends first to the R3 relationship descriptor 55 in data base B 30, from there to the R5 relationship descriptor 80 in data base B, and finally to the R6 descriptor 78. Again, two opposing pointers link the first and second R5 relationship descriptors 70, 80.

As stated above, the record descriptors 32, 66, 76 require only two pointer fields in order to function within the preferred embodiment of this invention. One of these fields contains the pointer to the first relationship descriptor in which the record descriptor's table is the parent table, i.e., to the first relationship descriptor in the record descriptor's parent chain. The other field points to the first relationship descriptor in the dependent chain. These pointers are listed in Table 1, below.

TABLE 1

| Fields Added to Record Descriptors | |
|---|---|
| REC.A | Pointer to the first relationship descriptor where record is a parent |
| REC.B | Pointer to the first relationship descriptor where record is a dependent |

REC.A is the pointer to the first relationship descriptor in the parent chain of relationship descriptors. The REL.E fields (described below) in the relationship descriptors continue the parent chain to any additional relationship descriptors in which this record descriptor's table is the parent.

REC.B is the pointer to the first relationship descriptor in a chain of relationship descriptors, in which this table is the DEPENDENT of the relationship. The REL.J fields in the relationship descriptors continue the dependent chain to any additional relationship descriptors in which this record descriptor's table is the dependent.

Relationship Descriptors

Table 2 lists the fields which make up the relationship

TABLE 2

| Relationship Descriptor Fields | |
|---|---|
| REL.A | Name of relationship |
| REL.B | Pointer to index descriptor for primary key index (required before inserts are allowed) |
| REL.C | Pointer to record descriptor for parent table |
| REL.D | Pointer to relationship descriptor for dependent table in a different data base |
| REL.E | Pointer to the next relationship descriptor for the same parent table |
| REL.F | Description of foreign key: number of fields, list of relative field numbers in the record in foreign key sequence |
| REL.G | Pointer to index descriptor for foreign key index (optional) |
| REL.H | Pointer to record descriptor for dependent table |
| REL.I | Pointer to relationship descriptor for parent in a different data base |
| REL.J | Pointer to the next relationship descriptor for the same dependent table |
| REL.K | Delete rule: "RESTRICT", "CASCADE", or "SET NULL" |
| REL.L | Update rule: "RESTRICT", "CASCADE", or "SET NULL" |

To outline the contents of the relationship descriptors, each relationship descriptor describes its constraint's parent and dependent tables, foreign key, access path (index or scan) by which the parent and dependent are to be accessed, and DELETE and UPDATE RULES. The parent table is always accessed via a primary key index, and so the description of the constraint's primary key is taken from the index descriptor for the primary key index. If the parent and dependent tables are in the same data base then there is one relationship descriptor for each constraint, and both the parent and dependent point to it. If the tables are in different data bases then a copy of the relationship descriptor exists for each data base.

Field REL.A contains the name of the relationship, e.g., "R1". Of course, more descriptive relationship names, e.g., "ADMRDEPT", could be used.

REL.B contains a pointer to the index descriptor of the constraint's primary key index. When the constraint is defined, it is determined whether a B-tree index type of access mechanism exists which will enforce the uniqueness constraint (entity integrity) of the primary key values. If such a unique index exists, then a pointer to its index descriptor is placed in REL.B. This provides means for INSERT operations to quickly determine whether the primary key uniqueness constraint has been violated. Other mechanisms for enforcing the primary key uniqueness constraint may be available, but are not implemented in the preferred embodiment. If no such mechanism exists, then INSERTs are prohibited until one is defined. At that time all relationship descriptors are queried to determine if the condition is now satisfied, and the REL.B fields will be made to point to the index descriptor.

REL.C points to the record descriptor for the parent table, providing access to the attributes of the primary key fields during constraint enforcement. Alternatively, the attributes of the primary key fields could have been replicated in the relationship descriptor, but such replication is considered to be less desirable than pointing to the parent table's record descriptor.

If the dependent table is in a different data base from the relationship descriptor, the REL.D field contains the symbolic address of the corresponding relationship descriptor within that data base. The symbolic address of REL.D consists of the name of the other data base plus a pointer to the corresponding relationship descriptor within that data base.

REL.E points to the next relationship descriptor in the parent chain, i.e., the next relationship descriptor which has the same parent table. The REL.F field contains a description of the foreign key. In particular, it includes the number of fields in the foreign key and the ordinal field positions within the record.

REL.G contains a pointer to the constraint's foreign key index, if one exists. When the constraint is defined, it is determined whether a B-tree index exists which matches the foreign key, or which has an index key of which the left-most columns match the foreign key. If so, a pointer to that index's descriptor is placed in REL.B. The existence of a foreign key index provides means for the DELETE and UPDATE operators to directly access the dependent table following the DELETE of a parent record or UPDATE of a primary key, thereby speeding their execution. If no foreign key index exists, then DELETEs and UPDATEs of primary keys will simply proceed slowly—each such action on a parent record forcing a complete scan of the table to locate matching dependent records. If a matching access mechanism is defined at a later time, then the pointer to the associated index descriptor will be supplied here.

The REL.H field contains a pointer to the record descriptor for the dependent table. This provides the attributes of the foreign key fields during constraint enforcement. Alternatively, the attributes of the foreign key fields could have been replicated in the relationship descriptor, but such replication is considered to be less desirable than pointing to the dependent table's record descriptor.

If the parent table is in a different data base from the relationship descriptor, then the REL.I field contains the symbolic address of the corresponding relationship descriptor within that data base. Like the symbolic address of the REL.D field, this address is made up of the name of the other data base and a pointer to the corresponding relationship descriptor within the data base.

REL.J contains the pointer to the next relationship descriptor in the dependent chain, i.e., the next relationship descriptor which has the same dependent table as the current descriptor.

REL.K contains the delete rule for the constraint, either "RESTRICT", "CASCADE", or "SET NULL". Similarly, REL.L contains the update rule for the constraint, again either "RESTRICT", "CASCADE", or "SET NULL".

Constraint Creation

A constraint may be created either when a dependent table is created or after the table is defined. In either case, a parent table must already exist and must have a primary key that matches the foreign key of the constraint. A pseudocode implementation of the preferred embodiment's method for creating a relationship descriptor for a constraint is shown in the program fragment of Example 1. It is assumed that both parent and dependent tables have been defined, and that the names of the constraint and the present and dependent tables, the foreign key definition, and the DELETE and UPDATE rules have been input and are available to the program fragment.

EXAMPLE 1

| | Pseudocode for Creating a Relationship Descriptor |
|---|---|
| 100 | Locate the parent table's record descriptor (PAR_REC). |
| 101 | IF the foreign key columns do not match the primary key columns in length and type THEN |
| 102 | Terminate the creation process. |
| 103 | Locate the dependent table's record descriptor (DEP_REC). |
| /= Allocate, format. and initialize the relationship descriptor associated with the parent table. =/ |
| 104 | Allocate and format a new empty relationship descriptor (NEW_REL) with all fields set to 0. |
| 105 | Set NEW_REL.A = constraint name. /= store constraint name in field REL.A =/ |
| 106 | IF unique index exists on primary key of parent table THEN |
| 107 | Set NEW_REL.B = pointer to index descriptor for that (the primary key) index. /= store pointer to primary key index descriptor in field REL.B =/ |
| 108 | Set NEW_REL.C = pointer to PAR_REC. /= store pointer to parent's record descriptor in field REL.C of new relationship descriptor =/ |
| /= Connect new relationship descriptor to parent chain =/ |
| 109 | IF PAR_REC.A = 0 THEN /= parent table is not yet a parent in other constraints =/ |
| 110 | Set PAR_REC.A = pointer to NEW_REL. /= place current relationship descriptor at head of parent chain =/ |
| 111 | ELSE |
| 112 | DO. |
| 113 | Search parent chain (originating in PAR_REC.A) for the proper point of insertion in the parent chain. |

| | Pseudocode for Creating a Relationship Descriptor |
|---|---|
| 114 | Set REL.E in the relationship descriptor prior to the point of insertion = pointer to NEW_REL. Set NEW_REL.E = pointer to relationship descriptor following the point of insertion (if any) /= Insert current relationship descriptor into parent chain at appropriate location =/ Set PAR_REC.A = pointer to NEW_REL. (if point of insertion is at the head of the chain) |
| 115 | END. |
| 116 | Set NEW_REL.K = delete rule. |
| 117 | Set NEW_REL.L = update rule. |
| /= Create corresponding relationship descriptor if dependent table is in other data base =/ |
| 118 | IF parent record descriptor PAR_REC and dependent record descriptor DEP_REC are in different data bases THEN |
| 119 | DO. |
| 120 | Set OLD_REL = NEW_REL. /= Save relationship descriptor associated with parent table =/ |
| 121 | Allocate and format a new empty relationship descriptor (NEW_REL) in the data base of the dependent with all fields set to 0. |
| 122 | Set NEW_REL.A = constraint name. /= store the constraint name in the dependent table's relationship descriptor NEW_REL =/ |
| 123 | Set OLD_REL.D = symbolic address of NEW_REL. /= connect the parent relationship descriptor to the dependent relationship descriptor just created =/ |
| 124 | Set NEW_REL.I = symbolic address of OLD_REL. /= connect the dependent relationship descriptor just created to the parent relationship descriptor =/ |
| 125 | END. |
| /= Initialize fields in the relationship descriptor that are associated with the dependent table. =/ |
| 126 | Set NEW_REL.F = number of fields in foreign key, and list of relative field numbers in foreign key sequence. /= store description of foreign key in field REL.F =/ |
| 127 | IF an index exists which matches the foreign key OR an index exists which contains the columns of the foreign key in the left-most part of the index key THEN |
| 128 | Set NEW_REL.G = pointer to foreign key index descriptor. /= store foreign key index's descriptor, if it exists, in field REL.G =/ |
| 129 | Set NEW_REL.H = pointer to DEP_REC. /= store pointer to dependent record descriptor in field REL.H =/ |
| /= Connect current relationship descriptor to dependent chain =/ |
| 130 | IF DEP_REC.B NOT = 0 THEN /= dependent table is a dependent in other constraints =/ |
| 131 | Set NEW_REL.J = pointer to the first relationship descriptor in the dependent chain |
| 132 | Set DEP_REC.B = pointer to NEW_REL. /= place current descriptor at head of dependent chain =/ |
| 133 | END. |

The pseudocode program fragment of Example 1 can be divided into two principle sections. Lines 104–117 create the relationship descriptors and fields associated with the referential constraint's parent table. Lines 118–136 relate to the constraint's relationship descriptor and fields associated with the dependent table. When the parent and independent tables are in the same data base, these two sections create a single relationship descriptor in that data base. When the parent and independent are in different data bases, lines 104–117 create a relationship descriptor in the parent table's data base, and lines 118–136 create a relationship descriptor in the dependent table's data base.

The creation process begins by checking the foreign key column specified for the referential constraint against the primary key columns of the parent table. The parent table's record descriptor is located (line 100), and the length and type of the foreign key columns are checked against those of the primary key columns (line 101). If they do not match, the creation process is terminated (line 102). Otherwise, the record descriptor for the dependent table is located.

The relationship descriptor associated with the parent table is created in lines 104–117. A new empty relationship descriptor is allocated and formatted (line 104), and the name of the referential constraint is stored in its field REL.A (line 105). A pointer to the index descriptor for the primary key index is stored in field REL.B of the new relationship descriptor (lines 106–107), if such an index exists. Otherwise, as noted above, INSERT operations will not be allowed to the parent table. Finally, a pointer to the parent table's record descriptor is stored in REL.C of the new relationship descriptor (line 108).

The new relationship descriptor associated with the parent table is then connected to the parent chain of relationship descriptors originating from the parent table's record descriptor. If the parent chain is empty, field REC.A of the parent record descriptor will be equal to zero (line 109). In this case, a pointer to the new relationship descriptor is stored in that field (line 110), placing the current relationship descriptor at the head of the parent chain. Otherwise, if a parent chain already exists (line 111), the current relationship descriptor should be placed into the chain such that the following order is maintained: DELETE RESTRICT relationship descriptors, followed by DELETE SET NULL relationship descriptors, followed by DELETE CASCADE relationship descriptors, in order to maintain optimal performance during delete operations. A ordering of relationship descriptors which provide optimal performance during update operations could also be maintained if desired. To determine the proper point of insertion into the parent chain, the parent chain is traced from its origin in the parent record descriptor until a relationship descriptor is found in the chain such that the new relationship descriptor must be inserted prior to it (line 113). Field REL.E of the relationship descriptor prior to the point of insertion is then set to point to the current relationship descriptor. To complete the insertion into the chain, NEW REL.E points to the relationship descriptor after the point of insertion, if such a descriptor exists (line 114). Otherwise NEW—REL.E remains equal to zero.

Creation of the relationship descriptor and fields associated with the parent table is completed by storing the referential constraint's delete and update rules in fields REL.K and REL.L of the new relationship descriptor, respectively.

If the dependent table is located in a data base other than that of the parent table, a second relationship descriptor is created in that other data base by lines 118–125. Otherwise, if both tables are in the same data base, those lines are skipped. Immediately thereafter, lines 126–136 store values in the fields associated with this dependent table, either in the second relationship descriptor of the other data base if such exists, or in the original relationship descriptor associated with the parent table.

Creation of a second relationship descriptor in the other data base begins by storing all of the fields of the just-created relationship descriptor associated with the parent table (line 120), so that it may be linked to the new relationship descriptor in the dependent table's data base. That new relationship descriptor is then allocated and formatted with all of its fields set to zero (line 121). The first of the opposing linking pointers between the data bases is set by placing a pointer in the REL.D field of the old relationship descriptor in the parent's data base to the current descriptor in the dependent's data base (line 122). This second of the opposing pointers is put in place by storing a pointer in the REL.I field of the current descriptor, in the dependent's data base, to the corresponding descriptor in the parent's data base (line 123). Finally, the name of the referential constraint is stored in field REL.A of the second relationship descriptor (line 124).

The fields in the current relationship descriptor (either the one newly created in the dependent table's data base, or the original one if both tables are in the same data base) associated with the dependent table are then initialized. A description of the foreign key is stored in field REL.F (line 126), and a pointer to the (optional) foreign key index is stored in field REL.G (lines 127–128). Lastly, a pointer to the record descriptor for the dependent table is stored in field REL.H (line 129).

The last step in creating a relationship descriptor(s) for referential constraint is to connect the current relationship descriptor to the dependent chain originating in the dependent table's record descriptor. The current relationship descriptor is always placed at the head of the dependent chain. If there are any elements in the dependent chain, the current relationship descriptor points to the first element in the chain (lines 130–131). The current relationship then becomes the new head of the dependent chain by storing a pointer to the current relationship descriptor in field REC.B of the dependent record descriptor (line 132). The process of creating the relationship descriptor(s) for the referential constraint is then complete, with the necessary information stored in the fields of the descriptor(s), including pointers connecting the descriptor to its associated parent and dependent chains.

Illustrative Example of Constraint Creation

For purposes of illustrating the creation of referential constraints according to this invention and the pseudocode of Example 1, the process of creating the constraints R1-R6 of FIGS. 1-6 is described next. It is assumed that DEPARTMENT, EMPLOYEE, and PROJECT tables have already been created, with columns, keys, and indexes as described above and shown in FIGS. 1-6, and that the foreign keys of the constraints always match their respective primary keys. The referential constraints are created in the order: R1, R4, R2, R6, R5, and R3. This order best illustrates the creation process—however, it will be understood that the constraints may be created by any order. Final values of the fields for the relationship descriptors for the constraints R1-R6 are listed in Table 3-6. The values given in Tables 3-6 are in their uncompiled, or source, form, i.e., as those values would have been input to the creation process by the user. The actual values stored in the data base manager are compiled for faster enforcement of the constraints during operation of the system.

Constraint R1 16 only involves the DEPARTMENT table 10, since it is a self-referencing constraint. The DEPARTMENT record descriptor 32 is located (lines 100, 103), and then the R1 relationship descriptor 50 is allocated and formatted (line 104). The constraint name "R1" is stored in field REL.A (line 105), and a pointer to the index descriptor 36 for the primary key index DEPTNO 38 is stored in field REL.B (lines 106-107). A pointer back to the DEPARTMENT record descriptor 32 is stored in REL.C (line 108). At this point in the creation process, the DEPARTMENT table 10 is not the parent table of any constraint. Field REC.A in the DEPARTMENT record descriptor 32 is therefore set to point to the R1 descriptor 50 (lines 109-110), and lines 111-115 are skipped. The delete and update rules for constraint R1, "CASCADE" and "RESTRICT" as shown in FIG. 2, are stored in fields REL.K and REL.L, respectively (lines 116-117).

Constraint R1's parent and dependent tables are both in data base A 28 (line 118), and so lines 119-125 are skipped. The foreign key of constraint R1 refers to only one column in the DEPARTMENT table 10—the ADMRDEPT column which is the fourth column in that table as shown in FIG. 3. Field REL.F in the R1 descriptor 50 therefore contains "1, 4" (line 126), i.e. "1" foreign key column, which is column number "4" in the dependent (DEPARTMENT) table. There is no foreign key index for constraint R1, so REL.G remains zero (lines 127-128). Field REL.H is set to point to R1's dependent record descriptor, the DEPARTMENT record descriptor 32. Finally, because the DEPARTMENT table 10 has no members in its dependent chain, a pointer 48 to the R1 descriptor 50 is stored in field REC.B of the DEPARTMENT record descriptor 32.

The relationship descriptor for constraint R4 22, which has the EMPLOYEE table 12 as its parent and the DEPARTMENT table 10 as its dependent, is created next. The record descriptors 66, 32 for these tables are located (lines 100, 103), and the R4 relationship descriptor 56 is allocated, formatted, and set to zero (line 104). The constraint name "R4" is stored in REL.A (line 105), a pointer to the EMPNO primary key index descriptor 60 is stored in REL.B (lines 106-107), and a pointer to the EMPLOYEE record descriptor 66 is stored in REL.C (line 108). Because the R4 relationship descriptor 56 is the first member in the EMPLOYEE parent chain, REC.A in the EMPLOYEE record descriptor 66 is set to point to the R4 descriptor (lines 109-110). The R4 delete and update rules, both "SET NULL", are stored in REL.K and REL.L, respectively (lines 116-117). Lines 119-125 are again skipped. REL.F is set to "1, 3" (line 126), because the foreign key "MGRNO" is the third column in the dependent DEPARTMENT table 10 as shown in FIG. 3. REL.G is left zero, since there is no foreign key index. REL.H is set to point to the dependent DEPARTMENT record descriptor 32 (line 129). Because the R4 relationship descriptor 56 is the first element in the dependent chain originating from the DEPARTMENT record descriptor 32 (lines 130, 132), the R4 descriptor is connected before the current first element in that chain, the R1 descriptor 50. Thus, a pointer to the R4 descriptor 56 is stored in field REC.B of the DEPARTMENT record descriptor 32, and field REL.J of the R4 descriptor 56 is set to point to the R1 descriptor 50 (lines 132-136).

The R2 relationship descriptor 52 is created next. Constraint R2 18 has DEPARTMENT as its parent table and EMPLOYEE as its dependent table, the opposite of constraint R4 22 discussed above. To create the R2 relationship descriptor 52, the DEPARTMENT and EMPLOYEE record descriptors 32, 66 are located (lines 100, 103), and the R2 descriptor 52 is allocated, formatted, and set to zero (line 104). The constraint name "R2" is stored in REL.A (line 105), a pointer to the DEPTNO primary key index descriptor 44 is stored in REL.B (lines 106-107), and a pointer to the DEPARTMENT parent record descriptor 32 is stored in REL.C (line 108). Because the R2 relationship descriptor 52 has a delete rule of "SET NULL" and the R1 relationship descriptor 50 which is on the DEPARTMENT parent chain has a delete rule of "CASCADE", the R2 relationship descriptor 52 is chained in front of the R1 relationship descriptor 50 (lines 109, 111-113) NEW—REL.E in the R2 relationship descriptor 52 is set to point to the R1 descriptor 50 and field REC.A in the DEPARTMENT record descriptor 32 is set to point to the R2 descriptor 52 (lines 114-115). The R2 delete and update rules "SET NULL" and "CASCADE" are stored in REL.K and REL.L, respectively (lines 116-117). Lines 119-125 are skipped. REL.F is set to "1, 3" (line 126), because the foreign key "WORKDEPT" is the third column in the EMPLOYEE table 12 as shown in FIG. 4. REL.G is set to point to the WORKDEPT index descriptor 62 (lines 127-128), since the WORKDEPT index 64 can act as the foreign key index for constraint R2. REL.H is et to point to the EMPLOYEE dependent record descriptor 32 (line 129). Because the R2 relationship descriptor 56 is the first element in the dependent chain originating from the EMPLOYEE record descriptor 66, a pointer to the R2 descriptor is placed in field REC.B of the EMPLOYEE descriptor 66 (lines 130-131).

The R6 relationship descriptor 78 is created next. Constraint R6 26 involves only the PROJECT table 10, since it is a self-referencing constraint. The PROJECT record descriptor 76 is located (lines 100, 103), and the R6 relationship descriptor 78 is allocated and formatted (line 104). The constraint name "R6" is stored in field REL.A (line 105), a pointer to the PROJNO primary key index descriptor 74 is stored in field REL.B (lines 106-107), and a pointer to the PROJECT record descriptor 76 is stored in REL.C (line 108). At this point in the creation process, the PROJECT table 10 is not the parent table of any constraint, so field REC.A in the PROJECT record descriptor 76 is set to point to the R6 relationship descriptor 78 (lines 109-110). The R6 delete and update rules, "CASCADE" and "RESTRICT", are stored in fields REL.K and REL.L, respectively (lines 116-117). Lines 119-125 are skipped since both parent and dependent tables are in the same data base (B). "1, 5" is stored in REL.F of the R6 descriptor 78, since the foreign key column MAJPROJ is the fifth column in the PROJECT table 14. There is no foreign key index for R6, so REL.G remains zero (lines 127-128). Field REL.H is set to point to the PROJECT record descriptor 76. Finally, because there are not yet members in the PROJECT dependent chain, REC. B in the PROJECT record descriptor 76 is set to point to the R6 descriptor 78.

Two relationship descriptors for constraint R5 are created next, one each in data base A 30 and data base B 30. As before, the EMPLOYEE and PROJECT record descriptors are located (lines 100, 103). First, an R5 relationship descriptor 70 is created in the data base where R5's parent table is located, i.e., in data base A 28 (line 104). The constraint name "R5" is stored in REL.A (line 105), a pointer to the EMPNO primary key index descriptor 60 is stored in REL.B (lines 106-107), and a pointer to the EMPLOYEE parent record descriptor 66 is stored in REL.C (line 108). Because this R5 relationship descriptor 70 has a delete rule of "RESTRICT" and the R4 relationship descriptor 56 which is on the EMPLOYEE parent chain has a delete rule of "SET NULL", the R5 relationship descriptor 70 is chained in front of the R4 relationship descriptor 56 (lines 109, 111-113) NEW—REL.E in the R5 relationship descriptor 70 is set to point to the R4 descriptor 56 and field REC.A in the EMPLOYEE record descriptor 66 is set to point to the R5 descriptor 70 (lines 114-115). The R5 delete and update rules, "RESTRICT" and "RESTRICT", are stored in REL.K and REL.L, respectively (lines 116-117).

Lines 119-125 of the program fragment of Example 1 are executed for constraint R5, since its tables are in different data bases (line 118). The first R5 relationship descriptor 70 in data base A 28 is retained (line 120), a second R5 descriptor 80 in data base B 30 is allocated and formatted to zeroes (line 121), and the constraint name "R5" is stored in the second descriptor's field REL.A (line 122). Pointers are set from the first R5 descriptor 70 to the second R5 descriptor 80 (line 123), and from the second back to the first (line 124). The fields in the second R5 descriptor 80 which are associated with the dependent (PROJECT) table are then filled in. REL.F receives the values "1, 4", indicating that the foreign key RESPEMP is the fourth column in the PROJECT table 14. REL.G remains zero, since there is no foreign key index. REL.H is set to point to the PROJECT record descriptor 76. Finally, the second R5 descriptor, in data base B 30, is chained at the head of the PROJECT dependent chain by changing the REC.B field of the PROJECT record descriptor 76 to point to the second R5 descriptor, and the REL.J field of the second R5 descriptor to point to the R6 relationship descriptor 78.

The last relationship descriptor created is for constraint R3 20. Like constraint R5, constraint R3 20 spans between data bases A and B 28, 30, and so results in the creation of two relationship descriptors, one in each data base. The DEPARTMENT and PROJECT record descriptors are located (lines 100, 103), and the first R5 relationship descriptor 54 is created in data base A 28 (line 104). The constraint name "R3" is stored in REL.A (line 105), a pointer to the DEPTNO primary key index descriptor 36 is stored in REL.B (lines 106-107), and a pointer to the DEPARTMENT parent record descriptor 32 is stored in REL.C (line 108). Because the R3 relationship descriptor 54 has a delete rule of "RESTRICT" and the R2 relationship descriptor 52 which is on the DEPARTMENT parent chain has a delete rule of "SET NULL" and the R1 relationship descriptor 50 which is on the DEPARTMENT parent chain has a delete rule of "RESTRICT", the R3 relationship descriptor 54 is chained in front of the R2 relationship descriptor 52 (lines 109, 111-113) NEW—REL.E in the R3 relationship descriptor 54 is set to point to the R2 descriptor 52 and field REC.A in the DEPARTMENT record descriptor 32 is set to point to the R3 descriptor 54 (lines 114-115). The R3 delete and update rules, "RESTRICT" and "CASCADE", are stored in REL.K and REL.L, respectively (line 116-117).

Creating the second R3 descriptor 55 in data base B 30, the first R3 relationship descriptor 54 in data base A 28 is retained (line 120), a second R3 descriptor 55 in data base B 30 is allocated and formatted to zeroes (line 121), and the constraint name "R3" is stored in the second descriptor's field REL.A (line 122). Pointers are set from the first R3 descriptor 54 to the second R3 descriptor 55 (line 123), and from the second back to the first (line 124). The fields in the second R3 descriptor which are associated with the dependent (PROJECT) table are then filled in. REL.F receives the values "1, 4", indicating that the foreign key RESPDEPT is the fourth column in the PROJECT table 14. REL.G remains zero, since there is no foreign key index. REL.H is set to point to the PROJECT record descriptor 76, and the second R3 descriptor 55 is chained at the head of the PROJECT dependent chain.

The final values of the fields in the relationship descriptors for constraints R1-R6 are set forth in Tables 3-6.

TABLE 3

| | R1 and R2 Relationship Descriptors | |
|---|---|---|
| | R1 Descriptor 50 | R2 Descriptor 52 |
| REL.A | "R1" | "R2" |
| REL.B | Pointer to DEPTNO index descriptor 36 | Pointer to DEPTNO index descriptor 36 |
| REL.C | Pointer to DEPARTMENT descriptor 32 | Pointer to DEPARTMENT descriptor 32 |
| REL.D | 0 | 0 |
| REL.E | 0 | Pointer to R1 descriptor 50 |
| REL.F | 1, 4 (ADMRDEPT) | 1, 3 (WORKDEPT) |
| REL.G | 0 | Pointer to WORKDEPT index descriptor 62 |
| REL.H | Pointer to DEPARTMENT descriptor 32 | Pointer to EMPLOYEE descriptor 66 |
| REL.I | 0 | 0 |
| REL.J | 0 | 0 |
| REL.K | "RESTRICT" | "SET NULL" |
| REL.L | "RESTRICT" | "CASCADE" |

TABLE 4

| | R3 Relationship Descriptors | |
|---|---|---|
| | R3 Descriptor 54 in Data Base A 28 | R3 Descriptor 55 in Data Base B 30 |
| REL.A | "R3" | "R3" |
| REL.B | Pointer to DEPTNO index descriptor 36 | 0 |
| REL.C | Pointer to DEPARTMENT descriptor 10 | 0 |
| REL.D | Pointer to R3 descriptor 55 in data base B 30 | 0 |
| REL.E | Pointer to R2 descriptor 52 | 0 |
| REL.F | 0 | 1, 3 (RESPDEPT) |
| REL.G | 0 | 0 |
| REL.H | 0 | Pointer to PROJECT descriptor 76 |
| REL.I | 0 | Pointer to R3 descriptor 54 in data base A 28 |
| REL.J | 0 | Pointer to R5 descriptor 80 in data base B 30 |
| REL.K | "CASCADE" | 0 |
| REL.L | "CASCADE" | 0 |

TABLE 5

| | R4 and R6 Relationship Descriptors | |
|---|---|---|
| | R4 Descriptor 56 | R6 Descriptor 78 |
| REL.A | "R4" | "R6" |
| REL.B | Pointer to EMPNO index descriptor 60 | Pointer to PROJNO index descriptor 74 |

TABLE 5-continued

R4 and R6 Relationship Descriptors

| | R4 Descriptor 56 | R6 Descriptor 78 |
|---|---|---|
| REL.C | Pointer to EMPLOYEE descriptor 66 | Pointer to PROJECT descriptor 76 |
| REL.D | 0 | 0 |
| REL.E | 0 | 0 |
| REL.F | 1, 3 (MGRNO) | 1, 5 (MAJPROJ) |
| REL.G | 0 | 0 |
| REL.H | Pointer to DEPARTMENT descriptor 32 | Pointer to PROJECT descriptor 76 |
| REL.I | 0 | 0 |
| REL.J | Pointer to R1 descriptor 50 | 0 |
| REL.K | "SET NULL" | "CASCADE" |
| REL.L | "SET NULL" | "RESTRICT" |

TABLE 6

R5 Relationship Descriptors

| | R5 Descriptor 70 in Data Base A 28 | R5 Descriptor 80 in Data Base B 30 |
|---|---|---|
| REL.A | "R5" | "R5" |
| REL.B | Pointer to EMPNO index descriptor 60 | 0 |
| REL.C | Pointer to EMPLOYEE descriptor 66 | 0 |
| REL.D | Pointer to R5 descriptor 70 in data base A | 0 |
| REL.E | Pointer to R4 descriptor 56 | 0 |
| REL.F | 0 | 1, 4 (RESPEMP) |
| REL.G | 0 | 0 |
| REL.H | 0 | Pointer to PROJECT descriptor 76 |
| REL.I | 0 | Pointer to R5 descriptor 70 in data base A |
| REL.J | 0 | Pointer to R6 descriptor 78 in data base B 30 |
| REL.K | "RESTRICT" | 0 |
| REL.L | "CASCADE" | 0 |

Compilation of Relationship Descriptors

The relationship descriptors created by the program fragment of Example 1 are compiled objects which are stored in the data base manager during system operation. This keeps the descriptors in the computer's high-speed memory and thereby allows extremely rapid access to the descriptors and enforcement of their constraints.

The input to the relationship descriptor creation consists of the names of the tables involved in the relationship, the foreign key, and the rules specified by the user. This input is derived from the user's original source definition statement, having been checked for syntactical and logical correctness. This checking is done in a preprocessing module. A pseudocode implementation of the preprocessing module of the preferred embodiment of this invention is shown in Example 2.

EXAMPLE 2

```
Pseudocode for Preprocessing a
Source Definition of a Relationship Descriptor
```

/= Parse source definition statement into parse tree =/
200  Check syntax of source definition statement.
201  IF syntax error THEN
202      Terminate compilation and return syntax error message.

-continued

```
Pseudocode for Preprocessing a
Source Definition of a Relationship Descriptor
```

203  Convert elements of source definition statement into tokens
     /= "tokenize" source definition statement =/
204  Arrange tokens into N-ary parse tree.
/= Interpret parse tree =/
205  Check for violation of existing referential logic by new relationship.
206  IF logic violation THEN
207      Terminate compilation and return logic error message.
208  Check for existence of objects referenced by the relationship.
209  IF missing object THEN
210      Terminate compilation and return missing object error message.
211  Change external names into internal names and numbers (ordinal values of columns, tables).
212  Pass translated internal table names and relationship description to data base descriptor manager for creation of compiled objective relationship descriptors.
     /= continue with program fragment of Example 1 =/
213  Insert changes into catalog.

The first step in preprocessing the user's source definition of the relationship descriptor parses the source definition statement into a parse tree. The elements of the source definition statement comprise the meta-data of the referential constraint. The syntax of the statement, i.e., its format and use of reserved words, are checked (line 200). If a syntax error is detected, an error message is generated and preprocessing is terminated. Otherwise, the elements of the source definition statement are converted into tokens (line 203), and the tokens are arranged into a N-ary parse tree (line 204) which is more easily manipulated than the character strings of the original statement's elements. The tokens consist of reserved words and object names. Creation of the parse tree in line 204 converts the reserved words into an internal representation which correspond to reserved words. The object names remain in the parse tree in textual form until they are converted into internal symbolic form at line 211, as described below.

Next, an interpreter produces the internal names of the tables involved in the relationship as well as a description of the foreign key and the rules corresponding to the constraint's meta-data, as that meta-data is represented by the parse tree. At this point, logical inconsistencies caused by the interaction of the current relationship with the already-existing relationships are detected (line 205), and preprocessing is terminated and an appropriate error message is generated (lines 206-207). If no logical inconsistencies are detected, then another check is made for the existence of objects necessary to the current relationship (line 208). This is done by checking the data base catalog, which contains a textual description of the data base. If an object needed by the relationship does not exist (line 209), then preprocessing is terminated and an error message is generated (line 210). Otherwise, if this last check is passed, the symbolic names in the parse tree (such as table and index names) are converted into internal names (line 211). Next, the program fragment of Example 1 is called (line 212) to create a compiled objective relationship descriptor from the translated internal table names and relationship description produced by the preprocessing of lines 200-211. After the fragment of Example 1 has produced the compiled descriptor, the internal names representing the meta-data of the referential constraint are passed back from the data base descriptor manager for conversion to textual form and insertion into the data base catalog (line 213).

Constraint Enforcement Using the Relationship Descriptors

When an INSERT or LOAD operation is made on a table, that table's dependent chain of relationship descriptors is traced and the constraints so located are enforced. First, the table's record descriptor is located. If field REC.B in the record descriptor is zero (0), then the dependent chain is empty and no further action is required.

If the record descriptor's REC.B field is nonzero, then the chain of relationship descriptors which originates there is traced and processed. For each relationship descriptor so located, the description of the foreign key in field REL.F is used to construct the foreign key contained in the record being loaded or inserted. If the resulting foreign key value is not null, it is used as a search argument against the primary key index to verify the existence of a row in the parent table with the matching primary key value. If no such row is found, the referential constraint of that relationship descriptor would be violated by the new row to be inserted or loaded, and the operation is disallowed. However, if all relationship descriptors in the dependent chain are satisfied, the INSERT or LOAD is allowed to proceed.

For an update of a table's primary key field or fields, the parent chain of relationship descriptors anchored in the REC.A field of the table's record descriptor is traced and processed. Each relationship descriptor located on the parent chain is used to determine the UPDATE rule to apply, to determine the dependent table, and to locate any dependent rows with a foreign key that matches the primary key being updated. The UPDATE operation is allowed or disallowed by enforcing the UPDATE rules so located, substantially as described above under the heading "Referential Integrity". If the UPDATE rule is "CASCADE", the parent chain of each dependent table so located is also traced and processed as described.

If a foreign key field is updated, the dependent chain of relationship descriptors anchored in REC.B is traced and processed. Each relationship descriptor that describes a foreign key that contains the modified field(s) is used to construct the updated foreign key value. If the updated value is not null, it is then used as a search argument against the primary key index identified in the relationship descriptor to verify the existence of a parent row with the primary key value matching the updated foreign key value. The UPDATE operation is disallowed if no such row is found for any one of the relationship descriptors on the dependent chain.

When a row is deleted, the parent chain of relationship descriptors anchored in REC.A of the deleted row's record descriptor is traced and processed. Each relationship descriptor located on the parent chain is used to determine the DELETE rule to apply, to identify the dependent table, and to locate any dependent rows with foreign key values matching the primary key value of the row being deleted. The DELETE operation is either carried out or disallowed depending on the particular DELETE rules stored in the REL.K fields of the relationship descriptors, again substantially as described above under the heading "Referential Integrity". If the DELETE rule is "CASCADE", the parent chain of each dependent table so located is also traced and processed as described.

FIG. 7 shows the relational database management system in block diagram form. The system includes at least two relational tables 90, at least one relationship descriptor 91 describing a referential constraint between the relational tables, record descriptors 92 providing access paths between the relational tables and the relationship descriptor, access means 93 for accessing the relationship descriptor through symbolic pointers when a relational table is to be modified, and enforcement means 94 for enforcing the referential constraint described by the relationship descriptor upon modification of a relational table.

It will be appreciated that, although a specific embodiment of the invention has been described herein for purposes of illustration, various modifications may be made without departing from the spirit and scope of the invention. For example, offsets, direct pointers or symbolic locations could be substituted for the symbolic pointers used to access the record, index, and relationship, descriptors. Accordingly, the scope of protection of this invention is limited only by the following claims.

We claim:

1. A computer-implemented, relational data base management system comprising:
   (a) a first table containing data records;
   (b) a second table containing data records;
   (c) a third table containing data records;
   (d) a first relationship descriptor, having pointer connections to the first table and the second table, for describing meta-data of a first referential constraint between the first and second tables, the meta-data including the first constraint's parent and dependent tables and primary and foreign keys, the first relationship descriptor being a separate object internal to the data base management system;
   (e) a second relationship descriptor, having pointer connections to one of the first two tables and the third table, for describing meta-data of a second referential constraint between one of the first two tables and the third table, the meta-data including the second constraint's parent and dependent tables and primary and foreign keys, the second relationship descriptor being a separate object internal to the data base management system;
   (f) a first chain for connecting the first and second relationship descriptors to their respective parent tables;
   (g) a second chain for connecting the first and second relationship descriptors to their respective dependent tables;
   (h) means for accessing the first and second relationship descriptors when any of the tables is to be modified; and
   (i) means for enforcing the referential constraints described by the first and second relationship descriptors upon such modification.

2. The system of claim 1, wherein the first relationship descriptor is stored within the data base system in compiled form.

3. The system of claim 1, further comprising:
   a first record descriptor for describing the data records of the first table, the first record descriptor being a separate object within the data base system which can be modified individually; and
   wherein the means for accessing the first relationship descriptor comprises a logical connection between the first relationship descriptor and the first record descriptor.

4. The system of claim 3, wherein the logical connection between the first record descriptor and the first relationship descriptor comprises a symbolic pointer from the first record descriptor to the first relationship descriptor.

5. The system of claim 4, wherein the first table is the parent table of the constraint and the second table is the dependent table of the constraint.

6. The system of claim 5, further including:
a second record descriptor for describing the records of the second table, the second record descriptor being a separate object within the data base system which can be modified individually; and
wherein the means for accessing the first relationship descriptor further comprises a logical connection between the second record descriptor and the first relationship descriptor.

7. The system of claim 6, wherein the logical connection between the second record descriptor and the first relationship descriptor comprises a symbolic pointer from the second record descriptor to the first relationship descriptor.

8. The system of claim 1, further comprising:
an index descriptor for describing a primary key index of the first table; and
wherein the first relationship descriptor identifies the constraint's primary key by referencing the index descriptor.

9. The system of claim 8, where the first relationship descriptor references the index descriptor by a logical connection from the first relationship descriptor to the index descriptor.

10. The system of claim 9, wherein the logical connection from the first relationship descriptor to the index descriptor comprises a symbolic pointer.

11. The system of claim 1, wherein the first and second relationship descriptors each include a delete rule having a value equal to any of "restrict," "set null," and "cascade," and wherein any relationship descriptor having a delete rule value of "restrict" precedes in the first and second chains any relationship descriptor having any other delete rule value.

12. The system of claim 11, wherein any relationship descriptor having a delete rule value of "set null" precedes in the first and second chains any relationship descriptor having a delete rule value of "cascade."

* * * * *